United States Patent [19]
Youssef

[11] Patent Number: 6,084,390
[45] Date of Patent: Jul. 4, 2000

[54] METHOD AND APPARATUS FOR INCREASING COMPARATOR GAIN WITHOUT AFFECTING STANDBY CURRENT

[75] Inventor: Tom Youssef, Dallas, Tex.

[73] Assignee: STMicroelectronics, Inc., Carrollton, Tex.

[21] Appl. No.: 09/217,323

[22] Filed: Dec. 21, 1998

[51] Int. Cl.[7] .................................. G05F 1/56; H02J 7/00
[52] U.S. Cl. .......................... 323/315; 307/66; 365/229
[58] Field of Search ..................................... 323/271, 273, 323/275, 282, 284; 307/46, 48, 64, 66, 77; 365/226, 227, 229

[56] References Cited

U.S. PATENT DOCUMENTS

| | | | |
|---|---|---|---|
| 4,122,359 | 10/1978 | Breikss | 307/64 |
| 4,451,742 | 5/1984 | Aswell | 307/66 |
| 4,713,555 | 12/1987 | Lee | 307/66 |
| 4,835,417 | 5/1989 | Kousaka et al. | 307/362 |
| 5,099,452 | 3/1992 | Yamakoshi et al. | 365/192 |
| 5,142,217 | 8/1992 | Gontowski, Jr. | 323/272 |

*Primary Examiner*—Matthew Nguyen
*Attorney, Agent, or Firm*—Theodore E. Galanthay; Lisa K. Jorgenson; Renee M. Larson

[57] ABSTRACT

A power supply switching circuit ensures stable, timely, and accurate transition between a primary power source and a secondary power source of an integrated circuit. A comparison element of the circuit compares a first voltage signal derived from a primary voltage of the primary power source to a second voltage signal, also derived from the primary voltage but having a different rate of change than the first voltage signal, to generate a compare output signal. The first and second voltage signals are characterized as being equal to each other when the primary voltage is equal to a predetermined crossover point at which the integrated circuit device will be powered by the primary voltage. When the primary voltage is less than the predetermined crossover point, a transistor element of a reference leg of a current mirror of the power supply switching circuit operates in back-bias mode and is sized large enough to ensure that the reference leg generates a large enough current to stabilize operation of the comparison element as the primary voltage ramps up until the primary voltage exceeds the predetermined crossover point.

27 Claims, 2 Drawing Sheets

METHOD AND APPARATUS FOR INCREASING COMPARATOR GAIN WITHOUT AFFECTING STANDBY CURRENT

BACKGROUND OF THE INVENTION

1. Field of the Invention

This invention relates generally to integrated circuits, and in particular to an improved apparatus and method for increasing comparator gain of a switchover circuit of an integrated circuit device without affecting standby current.

2. Background of the Invention

There are many environments today in which it is desirable to retain data in integrated circuits in the event that the primary, and typically external, power supply provided to an integrated circuit is interrupted or lost. In memory devices, for example, commercially available circuitry retains data in static random access memories (SRAMs) when primary power is removed. Representative examples of these devices, often referred to as "zero power circuits or devices," are described in the following patents: U.S. Pat. No. 4,122,359, entitled Memory Protection Arrangement; U.S. Pat. No. 4,451,742, entitled Power Supply Control for Integrated Circuit; U.S. Pat. No. 4,713,555, entitled Battery Charging Protection Circuit; and U.S. Pat. No. 5,099,453, entitled Configuration Memory for Programmable Logic Device. In a zero power circuit, the contents of the circuit are typically protected in the event that the primary power supply voltage to the circuit drops below a predetermined or selected voltage level that is normally defined to be a secondary or back-up voltage, such as a voltage supplied from a battery power supply.

In order to switch from the primary power supply to the secondary power supply upon failure of the primary power supply, typically the voltage level of both the primary and secondary power supplies be monitored and compared relative to each other. Comparators are particularly suited to this purpose. Comparator circuitry will sense when the primary power supply voltage provided to the circuit drops below the secondary power supply voltage by comparing these two voltages and the zero power circuit will accordingly cause the integrated circuit to receive power from the secondary power supply rather than from the primary power supply. The comparator circuitry also senses when the primary power source becomes larger than the secondary, battery power source so that the zero power circuit will want to switch from the secondary power supply back to the primary power supply voltage. Such is the case when the primary power supply is turned on and is ramping up to its nominal voltage level. The secondary, battery back-up power supply will need to supply the integrated circuit until the primary power supply has exceeded the secondary power supply.

A difficulty in comparing the primary power supply to the secondary power supply in order to determine how the integrated circuit device should be powered is the relative instability of the battery supply source itself. It is not uncommon for batteries to vary from approximately 2.9 volts to 3.4 volts, for instance, for a 3.3 volt integrated circuit device. Given the possible wide range of battery voltage, it is considered advantageous to determine which of the primary or secondary power sources should power the integrated circuit device based upon the voltage level of the more stable external, primary power supply. For this reason, it is often better to compare the external primary power supply voltage to a defined voltage in order to determine whether the integrated circuit device will be powered by the primary power source or the secondary power source.

Referring now to FIG. 1, a system 10 for switching between a primary power supply and a secondary power supply to power an integrated circuit device, according to the prior art, is illustrated. System 10 contains a switchover circuit that operates to switch between a two power sources capable of powering a 3.3 volt integrated circuit device, such as a Zeropower® or Timekeeper® memory device, capable of being powered by an external, primary power supply Vcc1 or an on-chip battery voltage source 42. Vcc1 is a voltage provided to the integrated circuit device by an external primary power supply source external to the integrated circuit and battery 42 is a secondary or back-up power supply source typically resident on-chip the integrated circuit device. System 10 of the integrated circuit device determines whether Vcc1 or battery voltage will power the integrated circuit device as a function of the magnitude of Vcc1 in comparison to a defined switchover point-in this example, 2.7 volts for a 3.3 volt integrated circuit device.

The system 10 is comprised of a switchover circuit, primary and secondary power supplies. The switchover circuit is comprised of a number of circuit elements, including PMOS transistors 12, 18, 20, and 32, NMOS transistors 14, 16, 22, 30, and 34, and comparator 28 and is provided with or coupled to Vref reference voltage 24, voltage signal 26, Vcc1, ground voltage Vss, and battery voltage 38 produced by battery 42. The output node 36 of the switchover circuit will typically be provided to the substrate or switch Vcc of the integrated circuit device. Q1 transistor 12 has a width to length ratio of 5/20 and transistor 14 has a width to length ratio of 5/10. A first source/drain of Q1 transistor 12 is coupled to Vcc1, a second source/drain of Q1 transistor 12 is coupled to a first source/drain and gate terminal of transistor 14, and a gate of Q1 transistor 12 is coupled to ground or Vss voltage potential. A second source/drain of transistor 14 is coupled to Vss potential. A first source/drain of transistor 18, a first source/drain of transistor 20 and a first source/drain of transistor 32 are likewise coupled to Vcc1 potential. A second source/drain of transistor 16, a second source/drain of transistor 22, and a second source/drain of transistor 30 are coupled to Vss potential. A second source/drain of transistor 18 is coupled to the gate terminal of transistor 18, the gate terminal of transistor 20, and a first source/drain of transistor 16, as shown. A second source/drain of transistor 20 is coupled to the first source/drain and the gate terminal of transistor 22. A first source/drain of transistor 30 is a control input to comparator 28. The Vso signal output 29 of comparator 28 is coupled to the gate terminal of transistor 32 and the gate terminal of transistor 34. A second source/drain of transistor 32 and the positive voltage terminal 38 of battery 42 together form an output node 36 of system 10 that is provided to the substrate or switch Vcc of the integrated circuit device.

The substrate of each of the PMOS transistors 12, 18, 20, and 32 are coupled to the switch Vcc. When external power supply Vcc1 is off (0 volts), the integrated circuit device is powered up by battery 42, with the substrate of PMOS transistors 12, 18, 20, and 32 at the battery voltage level 38 produced by battery 42. The voltage 38 supplied by battery 42 can typically vary from approximately 2.9 volts to 3.4 volts, depending upon the particular battery 42. Thus, when the integrated circuit device is powered up by battery 42, the substrates of PMOS transistors 12, 18, 20, and 32 can be biased at the battery voltage 38 of approximately 2.9 volts or higher.

Vref 24 and signal 26 are generated based on the Vcc1 level and compared by comparator 28. Vref signal 24 tracks Vcc1 voltage and is generally approximately 1.25 volts less than Vcc1 for a 3.3 volt device. Voltage signal 26 also tracks Vcc1 but at a slower rate. Vref signal 24 and signal 26 cross when Vcc1 is approximately 2.7 volts, the defined crossover point, regardless of the voltage 38 generated by battery 42. When Vcc1 is below 2.7 volts, Vref signal 24 is less than voltage signal 26 and Vso comparator output signal 29 transitions from a low to a high logic state to cause the integrated circuit device to be powered up by battery 42. When, however, Vcc1 is above 2.7 volts, Vref signal 24 is greater than signal 26 and thus Vso signal 29 transitions from a high to a low logic state and the device is powered up by externally provided voltage Vcc1. Given the wide range of possible battery voltages 38 supplies by battery 42, from approximately 2.9 to approximately 3.4 volts, the comparison of Vref signal 24 and voltage signal 26 by comparator 28 ensures that switchover between primary and secondary power sources is dictated by the relatively stable external power supply Vcc1 and not the battery voltage 38; Vso comparator output signal 29 will transition low or high solely as a function of Vcc1 and not battery voltage 38.

A problem with FIG. 1 arises as external power supply Vcc1 is ramping up and battery 42 is powering the integrated circuit device. Since all of the PMOS transistor substrates are on the switch Vcc of the integrated circuit when the integrated circuit device is powered up by the battery 42, the substrates of the PMOS transistors are at the battery voltage of 2.9 volts or higher. Q1 transistor 12 is in the back bias mode with its substrate at the battery voltage level as Vcc1 is ramping up and the device is powered by the battery 42. When Q1 transistor is thus back biased, the current through Q1 transistor 12 is mirrored at different gains to comparator 28 through the mirror legs formed by transistors 16, 18 and 20, 22 since Q1 transistor 12 in its back-biased mode does not generate enough current to cause the comparator to operate in a stable condition.

At the crossover point of 2.7 volts, the integrated circuit device will switch to the external supply Vcc1. If at this time the battery voltage 38 of battery 42 is 3 volts, for instance, then the substrate of PMOS transistors is also 3 volts and Q1 transistor 12 is back-biased, causing the current through node N1 to be less than that required by comparator 28 to operate in a stable manner. Comparator 28 stabilizes when the substrate of the integrated circuit device is driven down to the Vcc1 level, from 3 volts to 2.7 volts in this case, so that the PMOS transistors 12, 18, 20, and 32 are no longer back-biased. If the substrate is estimated to have 500 pF of capacitance, it can be expected to take approximately 8 to 10 nS to be driven down to the Vcc1 voltage level and approximately another 50 nS to stabilize and level off. As a result, comparator output signal 29 oscillates between a high logic state in which the battery will attempt to power the device and a low logic state in which the external power supply Vcc1 will attempt to power the device and the battery current will discharge-all because the current source through node N1 is not sufficient to cause comparator 28 to operate in a stable condition. When Vso comparator output signal 29 bounces from a low to a high state due to this unstable condition, current is unnecessarily drawn from battery 42 thereby shortening the operating life of the battery, particularly in environments in which a switchover between primary and secondary power sources occurs with some regularity. An example of this type of oscillation of signal 29 is shown in FIG. 2.

The instability of the comparator may cause the comparator circuitry output signal to "bounce" before it can settle to the proper level. A temporary, improper comparator circuitry output signal can cause the integrated circuit to be powered by the secondary, battery power supply even when the primary power source is higher than the defined crossover voltage point. Switching back to the battery while the primary power supply is higher than the battery level will cause an unnecessary high dynamic current to be drawn from the battery that will have the unfortunate consequence of reducing the battery life, particularly in those applications in which the external, principal power supply is switched on and off with some frequency.

From the foregoing description, it can be seen that there is a need in the art to ensure that the comparator be stabilized so that the output signal of the comparator circuitry be immediately reflective of its true logic state, in order to prevent false switching between the primary and secondary power supplies. Addressing this problem of the prior art will provide a more stable switchover between primary and second power supplies as well as prolong the life of the internal secondary, battery back-up power supply of the integrated circuit.

SUMMARY OF THE INVENTION

According to the principles of the present invention, an apparatus and method for switching between two power sources of an integrated circuit, a primary power supply and a secondary power supply, is provided. Both a power supply switching circuit of the integrated circuit and a system containing the same have at least a comparison element, a current mirror element, a control element, and a power coupling element. The comparison element receives and compares first and second voltage signals in order to generate a compare output signal and is controlled by a control signal at a control terminal. The first voltage signal tracks changes in a primary supply voltage provided by a primary power source, typically an external power supply, at a first rate and the second voltage signal tracks changes in the primary supply voltage at a second rate; the first voltage signal is equal to the second voltage signal at a predetermined value of the primary supply voltage. The secondary voltage is provided by a secondary power source, such as a battery, internal to the integrated circuit.

The current mirror element, coupled to the primary supply voltage provided by a primary power source and a reference voltage, has a reference leg and one or more mirror legs. The reference leg generates the current needed to stabilize comparison element operation and the one or more mirror legs mirror this current, at different gains, to the comparison element. The reference leg has a first transistor of a first type coupled to the primary supply voltage and in parallel to a second transistor of the first type and a first transistor of a second type coupled in series to the first and second transistors of the first type and to the reference voltage. The second transistor of the first type is sized large enough that the current generated by the reference leg when the first and second transistors of the first type are enabled in a back-biased mode is sufficient to stabilize the comparison element.

The control element receives the compare signal generated by the comparison element and selectively enables the second transistor of the first type of the reference leg according to the state of the compare signal so as to control the current generated by the current mirror. This is accomplished by selectively enabling and disabling the second transistor of the first type according to the compare signal. The power coupling element is also controlled by the compare signal to selectively couple the primary supply voltage or the secondary supply voltage produced by the secondary power source to an output node of the circuit that is coupled to a substrate of the integrated circuit.

When the primary supply voltage is less than the predetermined value, the first voltage signal is less than the second voltage signal and the compare signal generated by the comparison element transitions from a first logic state to a second logic state. The control element receives the compare signal of the second logic state and enables the second transistor of the first type so that the current provided to the control terminal of the comparison element is generated by both the first and second transistors of the first type of the reference leg operating in a back-biased mode, and the power coupling element selectively couples the secondary supply voltage to the output node. Conversely, when the primary supply voltage is more than the predetermined value, the first voltage signal is more than the second voltage signal and the compare signal generated by the comparison element transitions from the second logic state to the first logic state. The control element receives the compare signal of the first logic state and disables the second transistor of the first type since the current generated by the first transistor of the first type is sufficient to ensure stable comparison element operation when it is not in the back-bias mode. The power coupling element selectively couples the primary supply voltage to the output node.

The above as well as additional objectives, features, and advantages of the present invention will become apparent in the following detailed written description.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawings, wherein:

DESCRIPTION OF THE INVENTION

Figure 1:
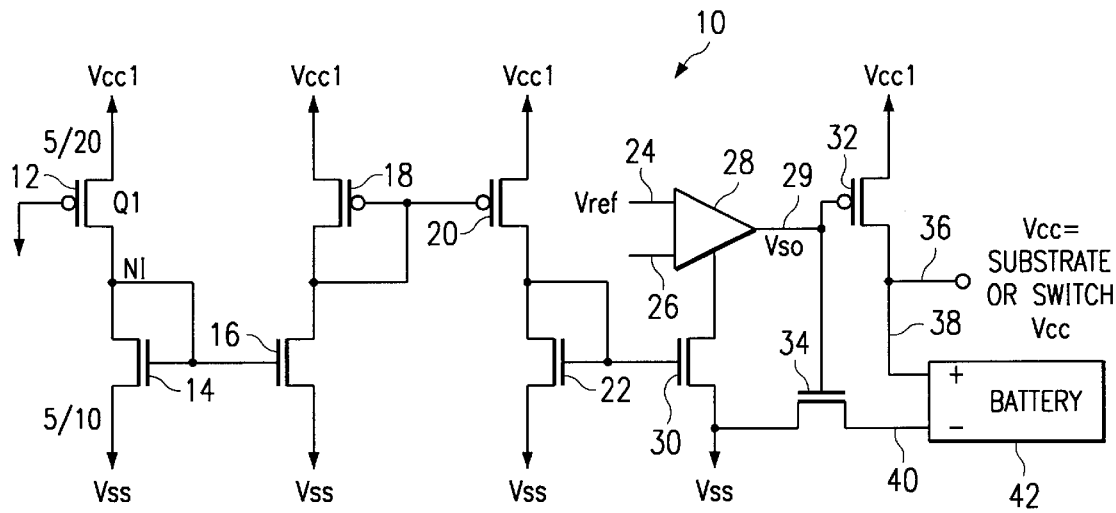
FIG. 1 is a system for switching between a primary power source and a secondary power source to power an integrated circuit device, according to the prior art.
Figure 3:
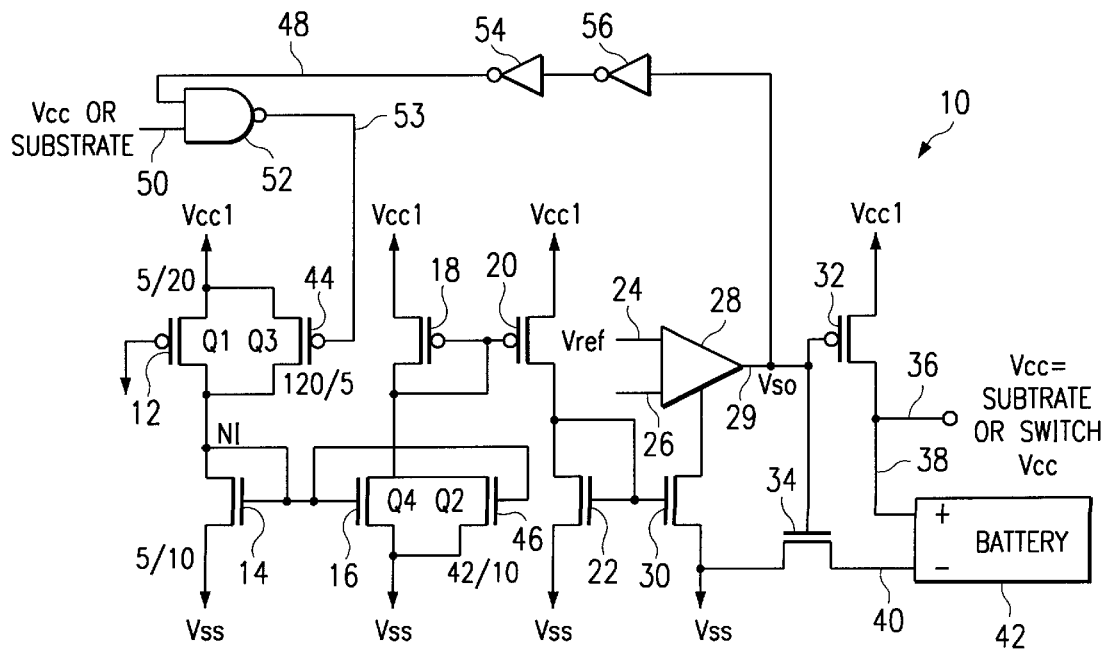
FIG. 3 is a system for switching between a primary power source and a secondary power source to power an integrated circuit device, according to the present invention.
Figure 2:
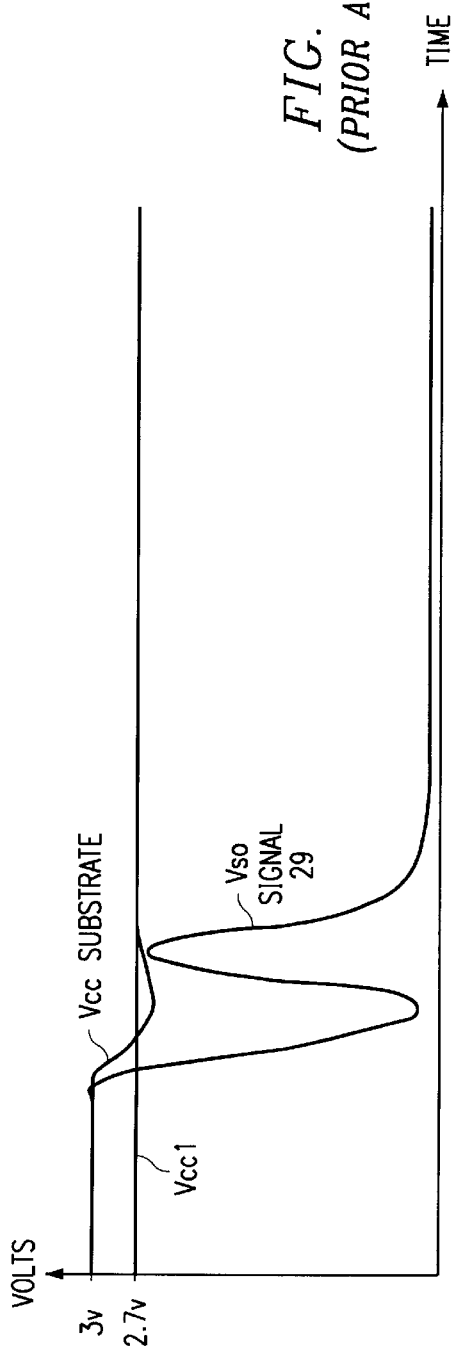
FIG. 2 is a waveform that demonstrates the shortcomings of a power switching system of the prior art.

Referring now to FIG. 3, an improved version of the system 10 and switchover circuit of FIG. 1, according to the present invention, is illustrated. Q3 transistor 33 has been added in parallel to Q1 transistor 12 and Q2 transistor 46 has been added in parallel to Q4 transistor 16, as shown. It should be noted here that Q2 transistor 46, while shown in FIG. 3, is an optional part of the circuit and is not therefore required to provide the desired functionality of the present invention. A first source/drain of Q3 transistor 44 is coupled to the first source/drain of Q1 transistor 12 and a second source/drain of Q3 transistor 44 is coupled to the second source/drain of Q1 transistor 12. A first source/drain and a second source/drain of Q2 transistor 46 is coupled to the first source/drain and the second source/drain of Q4 transistor 16, respectively, as shown. The gate of Q2 transistor is coupled to the gate of Q4 transistor 16 which in turn is coupled to the gate and first source/drain of transistor 14, as shown. As in FIG. 1, Q1 transistor 12 has a width to length ratio of 5/20 and transistor 14 has a width to length ratio of 5/10. Q2 transistor 46 has a width to length ratio of 42/10 and Q3 transistor 44 is a relatively large transistor with a width to length ratio of 120/5.

As previously described, Vref 24 and signal 26 are generated based on the Vcc1 voltage level and compared by comparator 28. Vref signal 24 tracks Vcc1 voltage and is generally approximately 1.25 volts less than Vcc1 for a 3.3 volt device. Voltage signal 26 also tracks Vcc1 but at a slower rate. Vref signal 24 and signal 26 cross when Vcc1 is approximately 2.7 volts, the defined crossover point, regardless of the voltage 38 generated by battery 42. When Vcc1 is below 2.7 volts, Vref signal 24 is less than voltage signal 26 and Vso comparator output signal 29 transitions from a low to a high logic state to cause the integrated circuit device to be powered up by battery 42. When, however, Vcc1 is above 2.7 volts, Vref signal 24 is greater than signal 26 and thus Vso signal 29 transitions from a high to a low logic state and the device is powered up by externally provided voltage Vcc1.

Figure 4:
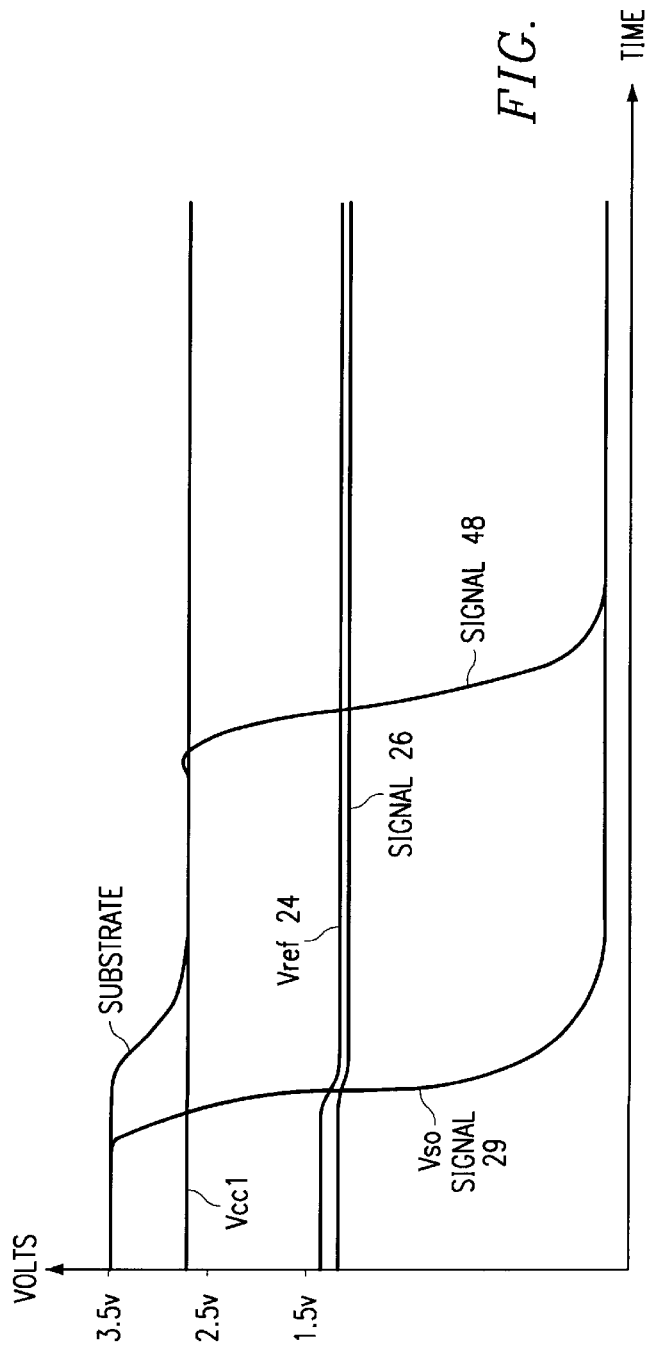
FIG. 4 is a waveform that demonstrates the power source switching capability of the present invention.

Thus as external power supply Vcc1 is being ramped up from a zero level, Vso comparator output signal 29 is a high logic state. Signal 29 is delayed by inverters 54, 56 to produce signal 48; signal 48, the delayed version of Vso signal 29, and signal 50, always a high logic state, are provided to NAND logic gate 52. The output signal 53 of NAND gate 52 when Vso signal 29 is high will be low and both transistors Q1 12 and Q3 44 will be on in the back-biased mode. Q1 transistor 12 and Q3 transistor 44 together generate enough current through node N1 in the back-biased mode to cause comparator 28 to operate in a stable condition. FIG. 4 illustrates this stable condition in which Vso output signal 29 transitions only one time from a high to a low logic state. The waveform of FIG. 4 demonstrates that Vso comparator output signal 29 does not oscillate before settling down to a low logic state upon Vcc1 becoming higher than 2.7 volts. Additional current is not drawn from battery 42. Also, the substrate level of PMOS transistors 12, 18, 20, 32, and 44 transitioned from the voltage level of the battery to the Vcc1 voltage level and stabilized before signal 48 went to a low logic state. Thus, Q1 and Q3 transistors 12, 44 together are capable of providing enough current to stabilize comparator 28, even when in the back-biased mode. It is noted that the voltage differential between Vref voltage 24 and voltage signal 26 is only about 100 mV and is required for comparator 28 to be able to switch output signal 29. Vref signal 24 and voltage signal 26 were equal at a time prior to the waveform shown in FIG. 4.

When the external power supply Vcc1 voltage level is above 2.7 volts, Vso comparator output signal 29 transitions from a high to a low logic state and the device is powered by Vcc1. At this time, Q1 and Q3 transistors 12 and 44 are not in back bias mode and Q1 transistor 12 will accordingly generate the required current for the comparator to operate in a stable mode; Q3 transistor 44 is turned off.

The sizing of Q3 transistor 44 is important. Q3 transistor 44 is a large transistor and the current generated by Q3 transistor 44 is mirrored through the current mirror legs comprised of transistors 16, 18, 46 and 20, 22 at different gains to stabilize comparator 28 as Vcc1 is ramping up; the current generated is provided to the control terminal of comparator 28 through transistor 30 as shown. The current mirror is comprised of a reference leg having Q1 transistor 12, Q3 transistor 44, and transistor 14 that behaves as a current source and one or more mirror legs. At least the mirror leg formed by transistor 18, Q4 transistor 16, and optional Q2 transistor 46 must be used to mirror the current generated by the current source of the reference leg. Additionally, the mirror leg formed by transistors 20, 22 may be used to provide additional gain of the current to the comparator 28. Since Q3 transistor 44 is a wide device, having a width to length ratio of 120 to 5 as shown in FIG. 3 and thus significantly increasing the standby current of the integrated circuit device by approximately 500 uA, it is desirable that Q3 transistor 44 be turned off when it is not needed to generate current necessary to stabilize comparator 28. This control of Q3 transistor 44 is provided by signal 48, a derivative signal of Vso comparator output signal 29. When Vso signal 29 transitions to a low logic state, signal 48 also transitions low after some delay introduced by inverters 54, 56, such as approximately 20 nS, causing the output signal 53 of NAND gate 52 to go high and turn off Q3 transistor 44. Turning off Q3 transistor 44 significantly reducing the amount of standby current consumed by the integrated circuit device. For example, while approximately 500 uA might be consumed with Q3 transistor on, only approximately 80 uA will be consumed by turning off Q3 transistor 44.

Transistor 34 operates to selectively couple the substrate of the integrated circuit device to either the primary or secondary power sources as a function of Vso compare output signal 29. When Vcc1 is above the 2.7 volts crossover point, Vso signal 29 is low and operates to turn off transistor 34, in effect disconnecting battery voltage 38 from the output node 36 connected to the substrate of the integrated circuit device. In this instance, Vcc1 voltage at output node 36 is provided to the substrate by transistor 32 to power the substrate and logic of the integrated circuit device. When, however, Vcc1 is below 2.7 volts, Vso signal 29 is high and transistor 34 is enabled, thereby connecting battery voltage 38 to the output node 36 so that the secondary, battery back-up voltage source powers the substrate and logic of the integrated circuit device.

The present invention can be used in a variety of applications in which it may become necessary to switch between a primary, external power source provided to an integrated circuit device and a secondary, internal back-up power source, such as a battery, to power the integrated circuit device. Integrated circuit devices that would find the invention particularly useful include, but are not limited to, a memory device that must keep very accurate time even when primary power is lost, such as the line of Timekeeper® SRAM devices manufactured by STMicroelectronics, Inc.

While the invention has been particularly shown and described with reference to a preferred embodiment, it will be understood by those skilled in the art that various changes in form and detail may be made therein without departing from the spirit and scope of the invention. For instance, one will recognize that the type or polarity of the PMOS and NMOS transistors in FIG. 3 may be changed, with minor commensurate changes to the circuitry without departing from the spirit and scope of the invention.

What is claimed is:

1. A power supply switching circuit for switching power supplies of an integrated circuit, the power supply switching circuit comprising:

a comparison element that receives a control signal at a control terminal, a first voltage signal, and a second voltage signal, compares the first voltage signal and the second voltage signal, and generates a compare signal, wherein the first voltage signal tracks changes in a primary supply voltage provided by primary power source at a first rate, the second voltage signal tracks changes in the primary supply voltage at a second rate, and the first voltage signal is equal to the second voltage signal at a predetermined value of the primary supply voltage;

a current mirror element, coupled to the primary supply voltage and a reference voltage, comprising a reference leg, having a first transistor of a first type coupled to the primary supply voltage and in parallel to a second transistor of the first type and a first transistor of a second type coupled in series to the first and second transistors of the first type and to the reference voltage, that operates as a current source to generate a current and having at least a first mirror leg that operates to mirror the current generated by the reference leg as the control signal to the control terminal of the comparison element, wherein the second transistor of the first type is sized large enough that the current generated by the reference leg when the first and second transistors of the first type are enabled in a back-biased mode is sufficient to stabilize the comparison element;

a control element that receives the compare signal generated by the comparison element and selectively enables the second transistor of the first type of the reference leg in accordance with the compare signal, thereby controlling the current generated by the reference leg of the current mirror element according to the compare signal; and a power coupling element controlled by the compare signal generated by the comparison element to selectively couple the primary supply voltage or a secondary supply voltage produced by a secondary power source to an output node of the system that is coupled to a substrate of the integrated circuit, wherein when the primary supply voltage is less than the predetermined value, the first voltage signal is less than the second voltage signal and the compare signal generated by the comparison element transitions from a first logic state to a second logic state, the control element receives the compare signal of the second logic state and enables the second transistor of the first type in order that the current generated by the reference leg of the current mirror element and provided to the control terminal of the comparison element is generated by both the first and second transistors of the first type operating in a back-biased mode, and the power coupling element selectively couples the secondary supply voltage to the output node, and when the primary supply voltage is more than the predetermined value, the first voltage signal is more than the second voltage signal and the compare signal generated by the comparison element transitions from the second logic state to the first logic state, the control element receives the compare signal of the first logic state and disables the second transistor of the first type in order that the current generated by the reference leg of the current mirror element is generated by the first transistor of the first type in a normal mode, and the power coupling element selectively couples the primary supply voltage to the output node.

2. The circuit of claim 1, wherein the first mirror leg comprises a third transistor of the first type coupled to the primary supply voltage and a second transistor of the second type coupled to the reference voltage and in series with the third transistor of the first type.

3. The circuit of claim 2, wherein the first mirror leg further comprises a third transistor of the second type coupled to the primary supply voltage and in parallel to the second transistor of the second type.

4. The circuit of claim 2, wherein the current mirror element further comprises a second mirror leg in parallel to the first mirror leg, with the second mirror leg comprising:

a fourth transistor of the first type coupled to the primary supply voltage, a third transistor of the second type in series with the fourth transistor of the first type and coupled to the reference voltage, and a fourth transistor of the second type coupled to the reference voltage, the third transistor of the second type, and the control terminal of the comparison element.

5. The circuit of claim 1, wherein the control element comprises:

a delay element that receives and delays the compare signal to generate a delayed compare signal; and a logic element that receives the delayed compare signal and enables the second transistor of the first type when the compare signal is the second logic state and disables the second transistor of the first type when the compare signal is the first logic state.

6. The circuit of claim 1, wherein the power coupling element is a power coupling transistor coupled to the current mirror element and the secondary power source, having a control terminal that is coupled to the compare signal generated by the comparison element.

7. The circuit of claim 1, wherein transistors of the first type are PMOS transistors and transistors of the second type are NMOS transistors.

8. The circuit of claim 1, wherein the primary power source is a power source external to the integrated circuit and the secondary power source is an internal battery of the integrated circuit.

9. A power supply switching system of an integrated circuit for switching between power sources of the integrated circuit, the system comprising:

a primary power source that generates a primary supply voltage;

a secondary power source that generates a secondary supply voltage;

a comparison element that receives a control signal at a control terminal, a first voltage signal, and a second voltage signal, compares the first voltage signal and the second voltage signal, and generates a compare signal, wherein the first voltage signal tracks changes in the primary supply voltage at a first rate, the second voltage signal tracks changes in the primary supply voltage at a second rate, and the first voltage signal is equal to the second voltage signal at a predetermined value of the primary supply voltage;

a current mirror element, coupled to the primary supply voltage and a reference voltage, comprising a reference leg, having a first transistor of a first type coupled to the primary supply voltage and in parallel to a second transistor of the first type and a first transistor of a second type coupled in series to the first and second transistors of the first type and to the reference voltage, that operates as a current source to generate a current and having at least a first mirror leg that operates to mirror the current generated by the reference leg as the control signal to the control terminal of the comparison element, wherein the second transistor of the first type is sized large enough that the current generated by the reference leg when the first and second transistors of the first type are enabled in a back-biased mode is sufficient to stabilize the comparison element;

a control element that receives the compare signal generated by the comparison element and selectively enables the second transistor of the first type of the reference leg in accordance with the compare signal, thereby controlling the current generated by the reference leg of the current mirror element according to the compare signal; and a power coupling element controlled by the compare signal generated by the comparison element to selectively couple the primary supply voltage or the secondary supply voltage to an output node of the system that is coupled to a substrate of the integrated circuit, wherein when the primary supply voltage is less than the predetermined value, the first voltage signal is less than the second voltage signal and the compare signal generated by the comparison element transitions from a first logic state to a second logic state, the control element receives the compare signal of the second logic state and enables the second transistor of the first type in order that the current generated by the reference leg of the current mirror element and provided to the control terminal of the comparison element is generated by both the first and second transistors of the first type operating in a back-biased mode, and the power coupling element selectively couples the secondary supply voltage to the output node, and when the primary supply voltage is more than the predetermined value, the first voltage signal is more than the second voltage signal and the compare signal generated by the comparison element transitions from the second logic state to the first logic state, the control element receives the compare signal of the first logic state and disables the second transistor of the first type in order that the current generated by the reference leg of the current mirror element is generated by the first transistor of the first type in a normal mode, and the power coupling element selectively couples the primary supply voltage to the output node.

10. The circuit of claim 9, wherein the first mirror leg comprises a third transistor of the first type coupled to the primary supply voltage and a second transistor of the second type coupled to the reference voltage and in series with the third transistor of the first type.

11. The circuit of claim 10, wherein the first mirror leg further comprises a third transistor of the second type coupled to the primary supply voltage and in parallel to the second transistor of the second type.

12. The circuit of claim 10, wherein the current mirror element further comprises a second mirror leg in parallel the first mirror leg, with the second mirror leg comprising:

a fourth transistor of the first type coupled to the primary supply voltage, a third transistor of the second type in series with the fourth transistor of the first type and coupled to the reference voltage, and a fourth transistor of the second type coupled to the reference voltage, the third transistor of the second type, and the control terminal of the comparison element.

13. The circuit of claim 9, wherein the control element comprises:

a delay element that receives and delays the compare signal to generate a delayed compare signal; and a logic element that receives the delayed compare signal and enables the second transistor of the first type when the compare signal is the second logic state and disables the second transistor of the first type when the compare signal is the first logic state.

14. The circuit of claim 9, wherein the power coupling element is a power coupling transistor coupled to the current mirror element and the secondary power source, having a control terminal that is coupled to the compare signal generated by the comparison element.

15. The circuit of claim 9, wherein transistors of the first type are PMOS transistors and transistors of the second type are NMOS transistors.

16. The circuit of claim 9, wherein the primary power source is a power source external to the integrated circuit and the secondary power source is an internal battery of the integrated circuit.

17. A power supply switching circuit for switching power supplies of an integrated circuit, the power supply switching circuit comprising:

a comparison element that receives a control signal at a control terminal, a first voltage signal, and a second voltage signal, compares the first voltage signal and the second voltage signal, and generates a compare signal, wherein the first voltage signal tracks changes in a primary supply voltage provided by primary power source at a first rate, the second voltage signal tracks changes in the primary supply voltage at a second rate, and the first voltage signal is equal to the second voltage signal at a predetermined value of the primary supply voltage;

a current mirror element, coupled to the primary supply voltage and a reference voltage, comprising a reference leg, having a first transistor of a first type coupled to the primary supply voltage and in parallel to a second transistor of the first type and a first transistor of a second type coupled in series to the first and second transistors of the first type and to the reference voltage, that operates as a current source to generate a current and having at least a first mirror leg that operates to mirror the current generated by the reference leg as the control signal to the control terminal of the comparison element, wherein the second transistor of the first type is sized large enough that the current generated by the reference leg when the first and second transistors of the first type are enabled in a back-biased mode is sufficient to stabilize the comparison element;

means for selectively enabling the second transistor of the first type in accordance with the compare signal, thereby controlling the current generated by the reference leg of the current mirror element according to the compare signal; and means for selectively coupling the primary supply voltage or a secondary supply voltage produced by a secondary power source to an output node of the system that is coupled to a substrate of the integrated circuit, wherein said means for selectively coupling is controlled by the compare signal, wherein when the primary supply voltage is less than the predetermined value, the first voltage signal is less than the second voltage signal and the compare signal generated by the comparison element transitions from a first logic state to a second logic state, the control element receives the compare signal of the second logic state and enables the second transistor of the first type in order that the current generated by the reference leg of the current mirror element and provided to the control terminal of the comparison element is generated by both the first and second transistors of the first type operating in a back-biased mode, and the power coupling element selectively couples the secondary supply voltage to the output node, and when the primary supply voltage is more than the predetermined value, the first voltage signal is more than the second voltage signal and the compare signal generated by the comparison element transitions from the second logic state to the first logic state, the control element receives the compare signal of the first logic state and disables the second transistor of the first type in order that the current generated by the reference leg of the current mirror element is generated by the first transistor of the first type in a normal mode, and the power coupling element selectively couples the primary supply voltage to the output node.

18. The circuit of claim 17, wherein the first mirror leg comprises a third transistor of the first type coupled to the primary supply voltage and a second transistor of the second type coupled to the reference voltage and in series with the third transistor of the first type.

19. The circuit of claim 18, wherein the first mirror leg further comprises a third transistor of the second type coupled to the primary supply voltage and in parallel to the second transistor of the second type.

20. The circuit of claim 18, wherein the current mirror element further comprises a second mirror leg in parallel to the first mirror leg, with the second mirror leg comprising:

a fourth transistor of the first type coupled to the primary supply voltage, a third transistor of the second type in series with the fourth transistor of the first type and coupled to the reference voltage, and a fourth transistor of the second type coupled to the reference voltage, the third transistor of the second type, and the control terminal of the comparison element.

21. The circuit of claim 17, wherein the means for selectively enabling the second transistor comprises:

a delay element that receives and delays the compare signal to generate a delayed compare signal; and a logic element that receives the delayed compare signal and enables the second transistor of the first type when the compare signal is the second logic state and disables the second transistor of the first type when the compare signal is the first logic state.

22. The circuit of claim 17, wherein the means for selectively coupling comprises a power coupling transistor coupled to the current mirror element and the secondary power source, having a control terminal that is coupled to the compare signal generated by the comparison element.

23. The circuit of claim 17, wherein transistors of the first type are PMOS transistors and transistors of the second type are NMOS transistors.

24. The circuit of claim 17, wherein the primary power source is a power source external to the integrated circuit and the secondary power source is an internal battery of the integrated circuit.

25. A method for switching between power sources of the integrated circuit, the method comprising the steps of:

comparing a first voltage signal and a second voltage signal to generate a compare signal, wherein the first voltage signal tracks changes in a primary supply voltage provided by a primary power source at a first rate, the second voltage signal tracks changes in the primary supply voltage at a second rate, and the first voltage signal is equal to the second voltage signal at a predetermined value of the primary supply voltage;

wherein when the primary supply voltage is less than the predetermined value and the compare signal generated by the comparison element transitions from a first logic state to a second logic state, enabling a transistor element in a back-bias mode of a reference leg of a current mirror so as to generate a current sufficient to stabilize a comparison element that generates the compare signal; and selectively coupling a secondary supply voltage generated by a secondary power source to a substrate of the integrated circuit device.

26. The method of claim 25, further comprising:

mirroring the current generated by the reference leg to the comparison element by at least one mirror leg of the current mirror.

27. The method of claim 25, further comprising:

wherein when the primary supply voltage is more than the predetermined value and the compare signal generated by the comparison element transitions from the second logic state to the first logic state, disabling the transistor element of the reference leg of the current mirror so as to generate a smaller current; and selectively coupling the primary supply voltage provided by the primary power source to the substrate of the integrated circuit device.

* * * * *